United States Patent Office 3,042,154
Patented July 3, 1962

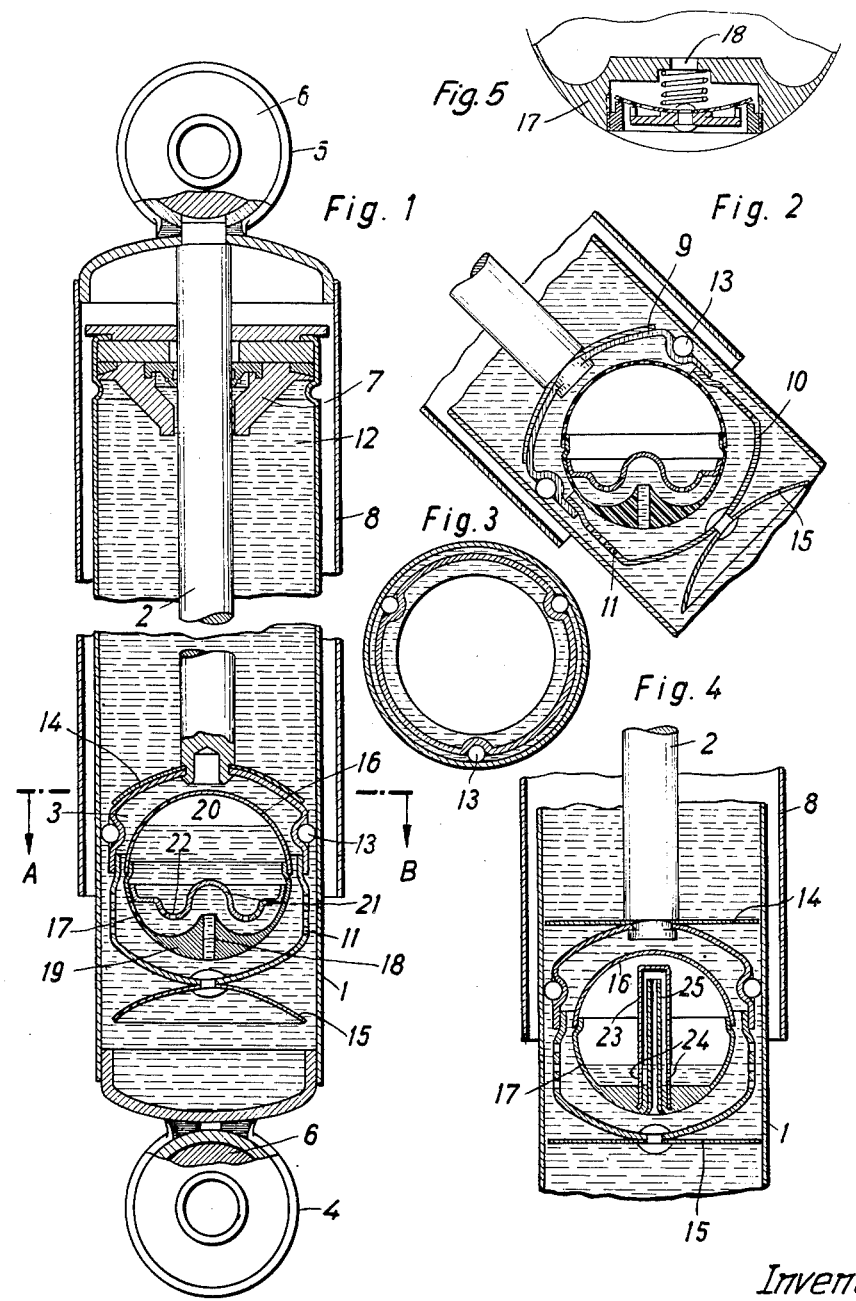

3,042,154
TELESCOPIC HYDRAULIC SINGLE-TUBE DASH-POT, MORE PARTICULARLY FOR USE IN MOTOR VEHICLES
Willi Zeidler, Dusseldorf, Germany, assignor to Firma Rheinmetall G.m.b.H., Dusseldorf, Germany
Filed Apr. 1, 1959, Ser. No. 803,484
Claims priority, application Germany Apr. 5, 1958
13 Claims. (Cl. 188—100)

The present invention relates to a telescopic hydraulic single-tube dashpot, more particularly for use in motor vehicles, of the type wherein an air cushion is provided to compensate for the piston rod volume, the said air cushion being located in side a hollow body floating in the damping liquid.

Several designs of this type of dashpot are known.

It is an object of the invention to provide a dashpot of this type which compared with the known designs is distinguished by a particularly simple and reliable construction and by the fact that it can be used in all positions. It is an important feature of the invention that between the outside air and the damping liquid there are no sliding separating or sealing elements which would thus be subject to wear.

According to the invention this problem is solved by the fact that the above mentioned hollow body consists of a self-righting bell or float capable of movement within the damping liquid independently of the adjacent components of the dashpot.

The hollow body according to the invention behaves therefore like a diving bell in stable equilibrium which, in the manner of a wobble motion, will by virtue of the eccentric position of the centre of gravity of the hollow body always swing into an upright position regardless of the inclination of the dashpot itself, the air cushion inside this diving bell compensating for the effect of the volume of the piston rod.

In a preferred embodiment the hollow float bell is of spherical or similar geometric shape since it will then adapt itself most readily and without noticeable delay to any given inclination of the dashpot.

The hollow body is provided with an orifice to permit damping liquid to enter and in order to prevent foaming or the formation of an emulsion, baffles are provided between the air cushion and the orifice in order to steady the flow of liquid. In cross-section these baffles may for example be of corrugated shape or they may take the shape of a bell cap positioned adjacent the orifice in the hollow body and which changes the direction, and thereby assists in settling the turbulence, of the flowing liquid.

Special characteristics can within the framework of the invention be imparted to the behaviour of the dashpot as for example by incorporating a control valve in the orifice of the hollow body and which preferably exhibits different characteristics depending on the direction of flow through it. Thus the valve may be of a type enabling the liquid to flow more readily out of than into the hollow body.

Further variations in the characteristics can for example be obtained by providing the hollow body not with rigid walls but with an at least partly flexible surface so that the hollow body is enabled to breathe, as it were.

The hollow body itself can be made of any suitable material as long as this is not affected by the properties of the damping liquid. But for ease of manufacture it appears preferable to make the body either of plastic or of rubber since then the required self-righting properties can be obtained particularly easily and at the same time appropriately e.g. by a local thickening of the wall of the body.

To provide the hollow body with an eccentric centre of gravity position a very convenient constructional method would be to build the hollow body up of materials having a different specific gravity. Thus it could for example be made of two hemispherical shells one of which is made of plastic whilst the other one, i.e. the one provided with the connecting orifice, is made of metal.

The hollow diving bell described above can within the framework of the invention be located at any desired position within the working chambers of the dashpot. However, a particularly advantageous design of the dashpot will result if the hollow body is located inside the piston of the dashpot and if the hollow space in the piston is in communication with the damping liquid by means of apertures in the wall of the piston.

The invention will now be described in greater detail with reference to the accompanying drawing in which embodiments of a single-tube dashpot are shown as follows:

FIG. 1 shows an overall view of the dashpot in longitudinal section in a vertical position, a hollow sphere being provided within the hollow piston in order to compensate for the effect of the volume of the piston rod, FIG. 2 shows a detail of FIG. 1, also in section, with the dashpot occupying an inclined position, FIG. 3 shows a cross section of the dashpot viewed in the direction of the arrows A—B of FIG. 1, FIG. 4 shows a detail of FIG. 1 but with a hollow body incorporating bell-shaped baffles, and FIG. 5 shows a detail of FIG. 1 including a spring pressed flap valve in the member 17.

As is shown by FIG. 1, the dashpot consists of a cylindrical tube 1 closed at either end within which slides a piston indicated generally at 3 at the end of a piston rod 2. The cylindrical tube 1 and the piston rod 2 are provided with the usual connecting lugs 4, 5 which are attached to flexible pads 6 and by means of which the dashpot can be hinged to the vehicle axle or the vehicle chassis respectively. The piston rod 2 is provided with a seal indicated generally at 7. Also attached to the piston rod is a tube 8 the purpose of which is to protect the piston rod against road dust and dirt.

The piston 3 attached to the piston rod 2 takes in the present case the form of a hollow piston made up of two sheet metal shells 9 and 10 (FIG. 2), the said hollow piston being in communication with the damping liquid 12 filling the cylinder 1 by means of apertures 11. The movement of the piston is guided by small balls 13 located in dimples in the upper piston shell 9.

To control the passage of the damping liquid, flat spring valves 14, 15 are provided attached to the piston and which in one limiting position bend so as to assume the shape of the adjacent end face of the piston as e.g. indicated for the plate valve 14 in FIG. 1. Hence it is possible to control within certain limits the amount of bending of the flat valves, and thus also the size of the clearance between the piston and the cylinder i.e. the damping performance of the dashpot, by appropriate design of the endfaces of the piston.

Inside the piston 3 there is located so as to be capable of independent movement a hollow sphere, built up in the case shown in the diagram of two hemispherical shells 16, 17. The hemispherical shell 17 is provided with an orifice 18 which connects the inside of the sphere with the dashpot chamber, and the wall thereof is thickened as indicated at 19. In consequence of this the hollow sphere 16, 17 exhibits a tendency—similar to a wobble motion as laterally in all directions—always to return to the position shown in FIG. 1, quite independently of the position or inclination which the dashpot may have at any given instant (FIG. 2). The hollow sphere contains an air cushion 20 and functions in a manner similar to that of a float bell.

Due to this property the air cushion 20 will always be located at the highest point of the hollow sphere 16, 17 thereby making it possible to provide compensation for the effect of the volume of the piston rod in all operating positions of the dashpot.

In order to prevent surging, foaming and turbulence of the damping liquid inside the sphere 16, 17 baffle plates are provided which in the case of the embodiment shown in FIGS. 1 to 3 consist of a corrugated partition 21 provided with openings 22 while in the case of the embodiment of FIG. 4 a bell cap 23 is provided for this purpose having openings 24 and covering a stand pipe 25.

I claim:

1. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body having a stable equilibrium position and consisting of a self-righting floating bell capable of movement within the damping liquid in the piston independently of the adjacent components of the dashpot, the hollow body being externally of spherical shape.

2. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body having a stable equilibrium position and consisting of a self-righting floating bell capable of movement within the damping liquid in the piston independently of the adjacent components the dashpot, the wall of the hollow body being provided with an orifice permitting the flow of damping liquid into the hollow body to form the air cushion therein.

3. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body having a stable equilibrium position and consisting of a self-righting floating bell capable of movement within the damping liquid in the piston independently of the adjacent components of the dashpot, in which the hollow body has rigid walls.

4. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body having a stable equilibrium position and consisting of a self-righting floating bell capable of movement within the damping liquid in the piston independently of the adjacent components of the dashpot, in which at least a part of the walls of the hollow body being flexible on the surface.

5. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body having a stable equilibrium position and consisting of a self-righting floating bell capable of movement within the damping liquid in the piston independently of the adjacent components of the dashpot, in which the hollow body consists of a plastic material.

6. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body having a stable equilibrium position and consisting of a self-righting floating bell capable of movement within the damping liquid in the piston independently of the adjacent components of the dashpot, the wall of the hollow body being provided with an orifice permitting the flow of damping liquid into the hollow body to form the air cushion therein, and a control valve provided in the orifice.

7. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body having a stable equilibrium position and consisting of a self-righting floating bell capable of movement within the damping liquid in the piston independently of the adjacent components of the dashpot, the wall of the hollow body being provided with an orifice permitting the flow of damping liquid into the hollow body to form the air cushion therein, and a control valve provided in the orifice with the control valve having different characteristics for the two directions of flow therethrough.

8. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body consisting of a self-righting floating bell capable of movement within the damping liquid in the piston independently of the adjacent components of the dashpot, and the hollow piston being in the form of a shell on the end of the piston rod with the hollow body located within the piston shell and is provided with openings to allow the damping liquid to pass into the hollow space inside the piston shell.

9. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body having a stable equilibrium position and consisting of a self-righting floating bell capable of movement within the damping liquid in the piston independently of the adjacent components of the dashpot, the hollow body being composed of individual parts of different specific gravity of which a lower part is composed of a heavier material.

10. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body consisting of a self-righting floating bell capable of movement within the damping liquid in the piston independently of the adjacent components of the dashpot, and the hollow piston being in the form of a shell on the end of the piston rod with the hollow body located within the piston shell and is provided with openings to allow the damping liquid to pass into the hollow space inside the piston shell, the top and bottom end faces of the piston shell being provided with valves each in the form of flat springs whose end position in one direction is determined by the external contour of the end faces.

11. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body consisting of a self-righting floating bell capable of movement within the damping liquid in the piston independently of the adjacent components of the dashpot, the wall of the hollow body being provided with an orifice permitting the flow of damping liquid into the hollow body to form the air cushion therein, and baffles provided in the hollow body between the air cushion and the orifice in order to steady the flow of liquid.

12. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body consisting of a self-righting floating bell capable of movement within the damping liquid in the piston independently of the adjacent components of the dashpot, the wall of the hollow body being provided with an orifice permitting the flow of damping liquid into the hollow body to form the air cushion therein, and baffles provided in the hollow body between the air cushion and the orifice in order to steady the flow of liquid and the baffles being corrugated in cross-section.

13. A telescopic hydraulic dashpot, more particularly for use in motor vehicles, comprising a single tube having a damping liquid therein, a piston rod extending into the tube, a hollow piston on the piston rod, a hollow body with an air cushion therein and floating in the damping liquid in the piston to compensate for the effect of the volume of the piston rod, and the hollow body consisting of a self-righting floating bell capable of movement within the damping liquid in the piston independently of the adjacent components of the dashpot, the wall of the hollow body being provided with an orifice permitting the flow of damping liquid into the hollow body to form the air cushion therein, and a bell cap provided adjacent the orifice for steadying the flow of liquid.

References Cited in the file of this patent

UNITED STATES PATENTS

| | | |
|---|---|---|
| 1,953,128 | Peteler | Apr. 3, 1934 |
| 2,357,278 | O'Connor | Aug. 29, 1944 |
| 2,701,714 | Harwood | Feb. 8, 1955 |
| 2,818,142 | Beaumont | Dec. 31, 1957 |
| 2,841,294 | Henrikson et al. | July 1, 1958 |

FOREIGN PATENTS

| | | |
|---|---|---|
| 1,069,128 | France | Feb. 10, 1954 |